(12) United States Patent
Pan et al.

(10) Patent No.: US 10,444,257 B2
(45) Date of Patent: Oct. 15, 2019

(54) HIGH-PRECISION MAGNETIC SUSPENSION ACCELEROMETER

(71) Applicant: CHINA THREE GORGES UNIVERSITY, Yichang, Hubei Province (CN)

(72) Inventors: Liqing Pan, Yichang (CN); Xianwei Yang, Yichang (CN); Zhihui Luo, Yichang (CN); Hua Zhao, Yichang (CN); Mingxue Shao, Yichang (CN); Qiongying Ren, Yichang (CN); Chao Tan, Yichang (CN); Min Liu, Yichang (CN); Chao Wang, Yichang (CN); Chao Zhang, Yichang (CN); Sheng Zheng, Yichang (CN); Hongguang Piao, Yichang (CN); Guangduo Lu, Yichang (CN); Yunli Xu, Yichang (CN); Xiufeng Huang, Yichang (CN)

(73) Assignee: CHINA THREE GORGES UNIVERSITY, Yichang, Hubei Province (CN)

( * ) Notice: Subject to any disclaimer, the term of this patent is extended or adjusted under 35 U.S.C. 154(b) by 191 days.

(21) Appl. No.: 15/435,356

(22) Filed: Feb. 17, 2017

(65) Prior Publication Data

US 2017/0242050 A1    Aug. 24, 2017

(30) Foreign Application Priority Data

Feb. 18, 2016 (CN) .......................... 2016 1 0090218
Feb. 18, 2016 (CN) .......................... 2016 1 0090220

(51) Int. Cl.
*G01P 15/13*    (2006.01)
*G01P 15/093*   (2006.01)
(Continued)

(52) U.S. Cl.
CPC .............. *G01P 15/132* (2013.01); *B64G 1/22* (2013.01); *G01P 15/093* (2013.01); *G01P 15/18* (2013.01)

(58) Field of Classification Search
CPC ........ G01P 15/093; G01P 15/132; B64G 1/24
See application file for complete search history.

(56) References Cited

U.S. PATENT DOCUMENTS

| 5,485,748 A | * | 1/1996 | Zeamer | ..................... G01G 7/04 |
| | | | | 310/90.5 |
| 6,571,631 B1 | * | 6/2003 | Yamamoto | .............. G01P 15/11 |
| | | | | 73/514.17 |

(Continued)

*Primary Examiner* — Herbert K Roberts
(74) *Attorney, Agent, or Firm* — Birch, Stewart, Kolasch & Birch, LLP (57) ABSTRACT

A high-precision magnetic suspension accelerometer for measuring the linear acceleration of a spacecraft is provided, comprising a magnetically shielded vacuum chamber system, a magnetic displacement sensing system, a magnetic suspension control system and a small magnetic proof mass. A optical coherence displacement detection technique is utilized for precisely measuring the position and the posture of the small magnetic proof mass in real time, and a magnetic suspension control technique is utilized for precisely controlling the position and the posture of the small magnetic proof mass to be brought back to the origin, so as to keep the small magnetic proof mass in the center of the systemic inner chamber. When the spacecraft is subject to a non-conservative force, the magnitude and direction of the acceleration can be precisely measured via the measurement of currents in the position control coils due to the acceleration of the spacecraft proportional to the currents of the position control coils. The accelerometer of the invention can avoid the technical bottleneck of high-precision machining, is easy to be produced and can achieve more high-precision measurement of the acceleration vector.

13 Claims, 5 Drawing Sheets

(51) Int. Cl.
*B64G 1/22* (2006.01)
*G01P 15/18* (2013.01)

(56) References Cited

U.S. PATENT DOCUMENTS

| | | | | |
|---|---|---|---|---|
| 2004/0244486 A1* | 12/2004 | Berstis | ................... | G01V 7/02 |
| | | | | 73/514.31 |
| 2005/0204817 A1* | 9/2005 | Boletis | ................... | G01C 9/00 |
| | | | | 73/514.18 |
| 2005/0217372 A1* | 10/2005 | Ao | ................... | G01C 19/5719 |
| | | | | 73/488 |

* cited by examiner

HIGH-PRECISION MAGNETIC SUSPENSION ACCELEROMETER

This application claims the priority benefit of Chinese application number 201610090220.7, filed on Feb. 18, 2016 and Chinese application number 201610090218.X, filed on Feb. 18, 2016. The entirety of the above-mentioned patent application is hereby incorporated by reference herein and made a part of this specification.

TECHNICAL FIELD

The present invention relates to an acceleration measuring device, especially to a high-precision magnetic suspension accelerometer.

BACKGROUND OF THE INVENTION

Accelerometers are a kind of instrument for measuring the linear acceleration of spacecrafts. High-precision magnetic suspension accelerometers are key loads for gravity survey satellites measuring the global gravity field, can improve the measurement precision of the global gravity field and make an united height datum established, and can also improve the existing space atmosphere model, as well as highly improve the precision of orbit determination of low orbit satellites and the precision of orbit prediction. For high orbit satellites, the high-precision magnetic suspension accelerometers can measure sunlight pressure and guarantee the precise orbit determination and maintenance of the high orbit satellites or spacecrafts. The high-precision magnetic suspension accelerometers can monitor the microgravity environment of the spacecrafts and serve the microgravity experiments. A plurality of high-precision accelerometers can constitute a gravity gradiometer.

The accelerometers can be divided into linear accelerometers and pendulum accelerometers according to the motion of a proof mass, and open-loop accelerometers and closed-loop accelerometers according to the detection mode whether the detected acceleration is needed to be fed back to the input from the output. Now the usual high-precision electrostatic accelerometers are often limited by processing techniques, such as orthogonality of the electrodes and symmetry of the panels, and the influence of noises of the circuit, the parasitic force and the environment is unavoidable.

SUMMARY OF THE INVENTION

Accordingly, it is an object of the invention to provide a high-precision magnetic suspension accelerometer, which can avoid the technical bottleneck of high-precision electrostatic accelerometer and has a higher measurement precision.

To achieve the above object, the present invention provides a high-precision magnetic suspension accelerometer, comprising a magnetically shielded vacuum chamber system, an optical coherence displacement detecting system, a magnetic suspension control system and a small magnetic proof mass, wherein, the magnetically shielded vacuum chamber system comprises a magnetically shielded outer chamber and a systemic inner chamber which is disposed inside the magnetically shielded outer chamber and vacuum, with the small magnetic proof mass disposed inside the systemic inner chamber; the optical coherence displacement detecting system, disposed on the systemic inner chamber, is used for monitoring the position and the posture of the small magnetic proof mass in real time by sending an optical signal to the small magnetic proof mass and receiving an optical signal reflected back; the magnetic suspension control system, disposed on the systemic inner chamber, is used for controlling the position and the posture of the small magnetic proof mass in real time to keep it levitating in the center of the systemic inner chamber constantly; and the center of the systemic inner chamber is coincident with the center of mass of a spacecraft.

The technical solution above should at least have advantages as follows: the high-precision magnetic suspension accelerometer of the present invention keeps advantages of the electrostatic suspension accelerometer, but avoids a technical bottleneck that the sensitive structure is difficult to be processed. The magnetically shielded vacuum chamber system can be easily realized. Influential factors of the circuit can be reduced and the position and the posture of the small magnetic proof mass can be measured precisely in real time via the optical coherence displacement detecting system. The position and the posture of the small magnetic proof mass can be precisely controlled via the magnetic suspension control system. Based on that the current in the position control coils is proportional to the linear acceleration of the small magnetic proof mass, the high-precision measurement of the acceleration vector can be realized.

To achieve the above object, the present invention provides another high-precision magnetic suspension accelerometer, for measuring the linear acceleration of a spacecraft, comprising a magnetically shielded vacuum chamber system, a magnetic displacement sensing system, a magnetic suspension control system and a small magnetic proof mass, wherein, the magnetically shielded vacuum chamber system comprises a magnetically shielded outer chamber and a systemic inner chamber which is disposed inside the magnetically shielded outer chamber and vacuum; the magnetic displacement sensing system comprises a plurality of high-precision magnetic sensors disposed at different positions inside the systemic inner chamber for monitoring the position and the posture of the small magnetic proof mass in real time through the detection of magnetic signals of the proof mass; the magnetic suspension control system comprises a plurality of groups of position control coils arranged symmetrically on the left and right side walls of the systemic inner chamber and a plurality of groups of posture control coils arranged symmetrically on the upper, lower, front and rear side walls of the systemic inner chamber; the magnetic suspension control system receives a feedback from the magnetic displacement sensing system via the position control coils and the posture control coils, and controls the position and the posture of the small magnetic proof mass in real time to keep it levitating in the center of the systemic inner chamber constantly; and the center of the systemic inner chamber is coincident with the center of mass of a spacecraft.

The technical solution above should at least have advantages as follows: the high-precision magnetic suspension accelerometer of the present invention keeps advantages of the electrostatic suspension accelerometer, but avoids a technical bottleneck that the sensitive structure is difficult to be processed. The magnetically shielded vacuum chamber system can be easily realized. The real-time position and posture of the small magnetic proof mass can be measured precisely via the high-precision magnetic sensors. The small magnetic proof mass can be precisely controlled via the magnetic suspension control system. So, the high-precision measurement of the acceleration vector can be realized.

BRIEF DESCRIPTION OF THE DRAWINGS

In order to make embodiments of the present invention or the prior art more clearly, the drawings referenced by the embodiments will be described briefly below. Apparently, the drawings below only illustrate part of the embodiments of the invention, and other drawings can be derived from these drawings below by those skilled in the art without creative work.

DETAILED DESCRIPTION OF THE INVENTION

Preferred embodiments of the present invention will be fully and clearly described below with reference to the accompanying drawings. Obviously, the embodiments described herein form only part, but not all, of the embodiments of the invention. Any other embodiments derived by those skilled in the art without creative work based on the embodiments described herein should be covered in the protection scope of the invention.

In order to make the above object, features and advantages of the invention more apparent and better understood, the present invention will be described below in detail with reference to the accompanying drawings and the preferred embodiments.

Figure 1:
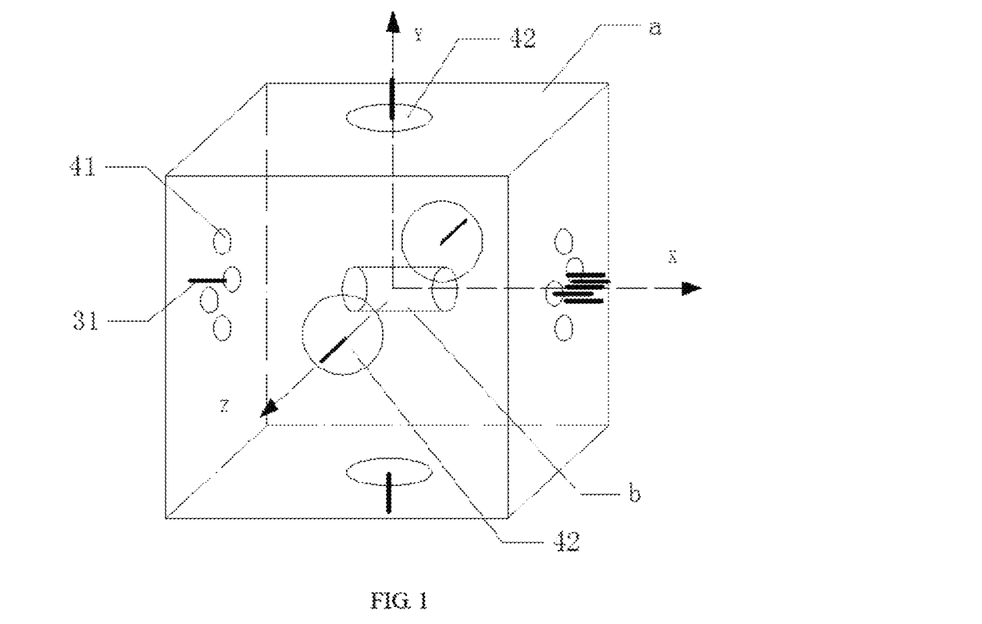
FIG. 1 is a schematic view of a first embodiment of a high-precision magnetic suspension accelerometer of the present invention.

FIG. 1 shows a high-precision magnetic suspension accelerometer in one embodiment of the invention, including a magnetically shielded vacuum chamber system, an optical coherence displacement detection system, a magnetic suspension control system and a small magnetic proof mass b. The magnetically shielded vacuum chamber system includes a magnetically shielded outer chamber and a systemic inner chamber a. The systemic inner chamber a is disposed inside the magnetically shielded outer chamber. The systemic inner chamber a is vacuum. The small magnetic proof mass b is disposed inside the systemic inner chamber a. The systemic inner chamber, in FIG. 1, with a vacuum of $10^{-5}$ Pa, has a size of 10 cm×10 cm×10 cm and a temperature stability of less than $10^{-2}$K/$\sqrt{Hz}$. The small magnetic proof mass is made of permanent magnetic material. It is cylindrical, and has a magnetic moment M of $6.25 \times 10^{-2}$ Am$^2$ and a mass of 1 g. Outside of the small magnetic proof mass is covered with non-magnetic material to make its mass reach 0.1 kg so as to weaken the disturbance from outside on the measurement of the acceleration of the proof mass.

The optical coherence displacement detecting system, disposed on the systemic inner chamber a, is used for monitoring the position and the posture of the small magnetic proof mass in real time by sending an optical signal to the small magnetic proof mass b and receiving an optical signal reflected back. The magnetic suspension control system, disposed on the systemic inner chamber a, is used for controlling the position and the posture of the small magnetic proof mass in real time to keep it levitating in the center of the systemic inner chamber a constantly. The center of the systemic inner chamber a is coincident with the center of mass of a spacecraft.

Figure 2:
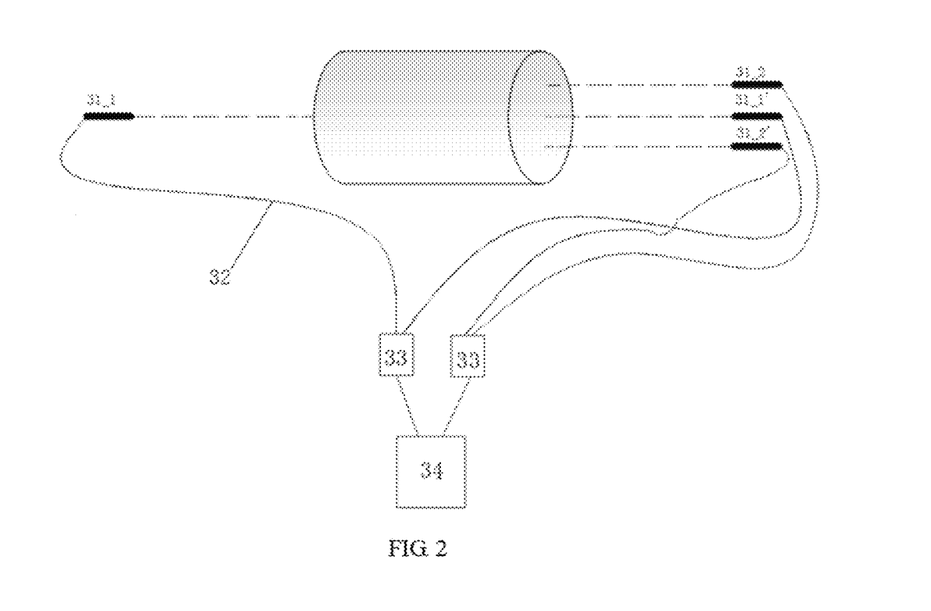
FIG. 2 illustrates the principle of an optical coherence displacement detection technique.

FIG. 2 shows an optical coherence displacement detection system, including a plurality of pairs of interferometer probes 31. Each pair of interferometer probes 31 is connected to an optical displacement detecting device 33 via an optical fiber 32. The interferometer probes 31 are located at different positions inside the systemic inner chamber.

A light source sends optical signals to the small magnetic proof mass b via each pair of interferometer probes 31 in the system and receives optical signals reflected back by it. The optical signals contain the information of the position and the posture of the small magnetic proof mass, and are sent to the optical displacement detecting device 33 through the optical fiber 32. The optical signals are processed according to the principle of optical interference, and the displacements and the deflection angles of the small magnetic proof mass may be transferred into recognizable light changes. Based on the measurement results of each pair of interferometer probes and by a calculation according to the principle of vector addition, the displacement of the small magnetic proof mass deviating from the center of the systemic inner chamber a, and the rotation angle of it rotating about two rotational axes perpendicular to the direction of the magnetic moment, can be finally determined and fed back to the magnetic suspension control system to control the position and the posture of the small magnetic proof mass in real time.

Further, five pairs of interferometer probes 31 may be provided. Three pairs of these are provided in the x-direction, i.e., on the left and right chamber walls. One pair of the three pairs, arranged on the right chamber wall along the y-direction and vertically symmetrical about the face center, is used for measuring the posture change of the small magnetic proof mass rotating about the z-axis. Another pair of the three ones, arranged on the right chamber wall along the z-direction and horizontally symmetrical about the face center, is used for measuring the posture change of the small magnetic proof mass rotating about the y-axis. The last pair of the three ones, arranged in the centers of the left and right chamber walls along the x-direction, is used for measuring the translational displacement of the small magnetic proof mass in the x-direction. Another pair of the five ones, provided in the y-direction, i.e., in the centers of the upper and lower chamber walls, is used for measuring the translational displacement of the small magnetic proof mass in the y-direction. The last pair of the five ones, provided in the z-direction, i.e., in the centers of the front and rear chamber walls, is used for measuring the translational displacement of the small magnetic proof mass in the z-direction.

A first method for detecting the optical coherence displacement will be described below, Below, a Michelson displacement detecting device with equal arm lengths will be taken as an example to analyze the displacement measurement of the small magnetic proof mass.

(1) Measurement of the Translational Displacement of the Small Magnetic Proof Mass The height of the cylindrical proof mass b is denoted as h, and the radius as r. The center of the systemic inner chamber is assumed to be the origin. As shown in FIG. 2, in an initial state, the small magnetic proof mass is located in the center of the systemic inner chamber, and its central axis is coincident with the x-axis. Optical signals sent by one pair of interferometer probes 31_1, 31_1' in the centers of the chamber walls in the x-direction have probe points $$\left(\frac{h}{2}, 0, 0\right), \left(-\frac{h}{2}, 0, 0\right)$$

respectively on the small magnetic proof mass. After the optical signal sent by this pair of interferometer probes is reflected by the small magnetic proof mass, the phase difference thereof is changed to be zero, and the optical coherence displacement detecting system outputs a constant direct current signal. When the small magnetic proof mass is translated in the direction of the positive x-axis, and the translational displacement thereof is denoted as $\Delta x$, the negative optical path of the Michelson interference arm connected to this pair of interferometer probes may increase by $2\Delta x$ and the positive path may decrease by $2\Delta x$. So, the total change in optical length of the two-way light signals should be:

$$2\Delta x - (-2\Delta x) = 4\Delta x \qquad (1)$$

Accordingly, a change in phase should be $$\Delta \Phi_1 = \frac{2\pi}{\lambda} \cdot 4\Delta x \qquad (2)$$

where $\lambda$ is the wavelength of the optical signals sent by the laser light source. Because the change in phase $\Delta \Phi_1$ can be sent to the digital phase demodulation PGC circuit 34 from the corresponding Michelson displacement detecting device 33 with equal arm lengths, the translational displacement of the small magnetic proof mass in the x-direction can be given by $$\Delta x = \frac{\Delta \Phi_1}{8\pi} \lambda \qquad (3)$$

Using the same method as above, the translational displacements of the small magnetic proof mass in the directions of the y-axis and z-axis can be determined via each of the pairs of interferometer probes in the directions of the y-axis and z-axis.

(2) Measurement of the Deflection Angle of the Small Magnetic Proof Mass

Figure 3:
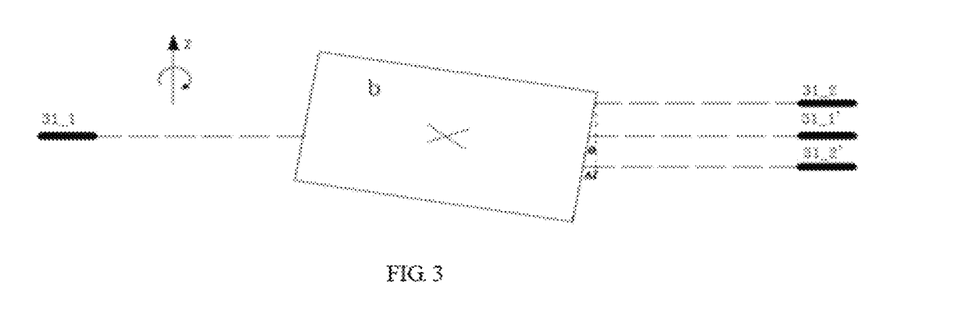
FIG. 3 illustrates the measurement of the deflection angle of a small magnetic proof mass.

Assuming that the small magnetic proof mass rotates about the z-axis, as shown in FIG. 3, and the deflection angle is denoted as $\theta$, then $$\tan \theta = \frac{\Delta l}{e} \qquad (4)$$

where e is the vertical distance between the two interferometer probes 31_2, 31_2' and is a fixed value, and $\Delta l$ is the length of the projection in the x-direction of the line between probe points formed on the small magnetic proof mass by the optical signals from the pair of the interferometer probes. Then, a change in optical length of the optical signals received by the two interferometer probes 31_2, 31_2' should be 2 $\Delta l$, and accordingly a change in phase can be given by $$\Delta \Phi_2 = \frac{2\pi}{\lambda} 2\Delta l \qquad (5)$$

Then, $$\Delta l = \frac{\Delta \Phi_2}{4\pi} \lambda \qquad (6)$$

Consequently, the deflection angle $\theta$ of the small magnetic proof mass rotating about the z-axis can be given by $$\theta = \arctan \frac{\Delta l}{e} = \arctan \frac{\lambda \Delta \Phi_2}{4\pi e} \qquad (7)$$

Using the same method as above, the deflection angle of the small magnetic proof mass rotating about the y-direction can be determined via another pair of interferometer probes above the chamber wall and orthogonal to the two interferometer probes 31_2, 31_2'.

In addition, when the small magnetic proof mass rotates about the axis, calculations according to geometric relationships show that the optical lengths of the optical signals from the interferometer probes 31_1, 31_1' increase or decrease by an equal value, which means that the phase difference between the optical signals received is zero. So, it can be seen that the rotation of the small magnetic proof mass does not interfere with the measurement of the translational displacement thereof.

The theoretical measurement precision of the common optical interference method is in nanometer scale. The measurement precision of the present method may be improved 4 times due to the Michelson interference technique utilized and the two-armed differential detection method introduced. Based on this, subnanometer location precision can be expected. The measurement precision of the posture and the rotation of the small magnetic proof mass is less than 0.002 arcsec.

A second method for detecting the optical coherence displacement will be described below.

In addition, the displacement of the small magnetic proof mass can also be measured via a Fabry-Perot (F-P) displacement detecting device. As shown in FIG. 2, when the small magnetic proof mass is translated in the direction of the positive x-axis, the translational displacement thereof is denoted as $\Delta x$, and a change in the wavelength of the F-P displacement detecting device connected to the interferometer probes 31_1, 31_1' can be given by $$\Delta \lambda \approx \frac{\lambda_0^2}{2n_g l} \qquad (8)$$

where $\lambda_0$ is the central wavelength of the F-P interfering spectrum, l is the length of the cavity of the interferometer and $n_g$ is the refractive index of a medium. The change of l measured contains the translational displacement $\Delta x$ of the proof mass. The displacement measurement precision can be in pm level after the displacement demodulation device 34 compensating for environmental errors. This method eliminates the effect of the variation of the light intensity on the measurement results. This may make the measurement system have a much stronger interference rejection capability. Absolute measurement of displacements can be achieved based on the one-to-one correspondence between the length of the cavity of the FT and the distances between wave peaks in the interference spectrum. Using the same method as above, the translational displacements of the small magnetic proof mass in the two directions of the y-axis and z-axis can be determined via each of the pairs of the interferometer probes in the directions of the y-axis and z-axis.

For the measurement of the deflection angle of the small magnetic proof mass, $\Delta l$ in the equation (4) is the displacement measured by the F-P displacement detecting device 33 connected to the two interferometer probes 31_2, 31_2'. Then, the deflection angle $\theta$ of the small magnetic proof mass rotating about the z-axis can be given by $$\theta = \arctan\frac{\Delta l}{e} \quad (9)$$

Using the same method as above, the deflection angle of the small magnetic proof mass rotating about the y-direction can be determined via another pair of interferometer probes above the chamber wall and orthogonal to the two interferometer probes 31_2, 31_2'. Due to the F-P interference technique utilized in the present method, the measurement precision of the posture and the rotation of the small magnetic proof mass is less than 0.0002 arcsec.

Figure 4:
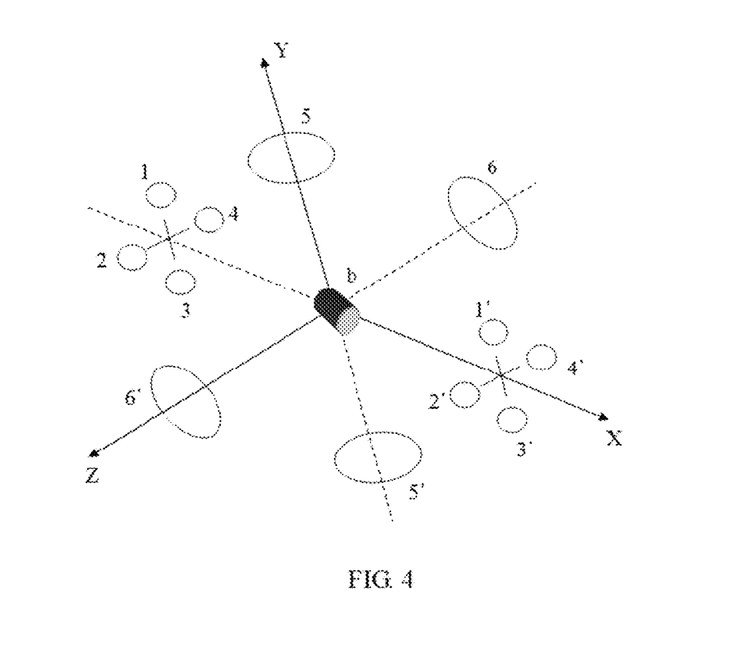
FIG. 4 is a schematic view of a magnetic suspension control system of the small magnetic proof mass.

As shown in FIG. 4, the magnetic suspension control system includes four pairs of position control coils 41 and two pairs of posture control coils 42. The four pairs of the position control coils, symmetric about the x-axis, are mounted on the left and right chamber walls in the x-direction of the systemic inner chamber, and can make the center of mass of the small magnetic proof mass always kept in the center of the systemic inner chamber by being applied with currents in different directions and with different intensities. The two pairs of posture control coils are mounted in the centers of the upper and lower chamber walls of the systemic inner chamber in the y-direction and in the centers of the front and rear chamber walls in the z-direction respectively. The diameter of the posture control coils is considerably greater than the overall dimension of the small magnetic proof mass. The posture control coils are used for controlling the posture of the small magnetic proof mass, and the equivalent magnetic moment of the small magnetic proof mass is controlled to be always kept in the x-direction. The magnitude of the current in the coils can be controlled precisely ranging across more than seven orders of magnitude, such as in a current range of 1 nA-10 mA.

The magnetic suspension control system receives a feedback from the optical coherence displacement detecting system via the position control coils 41 and the posture control coils 42, and controls the position and the posture of the small magnetic proof mass in real time to keep it always levitating in the center of the systemic inner chamber a. The center of the systemic inner chamber a is coincident with the center of mass of the spacecraft.

The diameter of each of the four pairs of the position control coils may be 0.56 cm, and the number of turns of each may be 100. The center of the systemic inner chamber is assumed to be the origin, in the coordinate system as shown in FIG. 1, the coordinates of the centers of the position control coils are (−5 cm, 1 cm, 0), (5 cm, 1 cm, 0), (−5 cm, 0, 1 cm), (5 cm, 0, 1 cm), (−5 cm, −1 cm, 0), (5 cm, −1 cm, 0), (−5 cm, 0, −1 cm) and (5 cm, 0, −1 cm). The diameter of each of the two pairs of the posture control coils may be 1.2 cm, and the number of turns of each may be 100. The coordinates of the centers of the posture control coils are (0, 5 cm, 0), (0, −5 cm, 0), (0, 0, 5 cm) and (0, 0, −5 cm).

The basic method for controlling the position and the posture of the small magnetic proof mass will be described below.

When the dimension of the small magnetic proof mass is very small, it may be equivalent to one magnetic dipole (with a magnetic moment $\vec{M}$). When the magnetic dipole is located in a magnetic field (with a magnetic induction intensity $\vec{B}$), there mainly exists two kinds of action forms for the magnetic dipole subject to the magnetic field. When the direction of the magnetic dipole is inconsistent with that of the external magnetic field, the magnetic dipole may be subject to a rotational moment $\vec{M} \times \vec{B}$, and may be rotated accordingly until its direction is consistent with that of the external magnetic field. At that moment, the magnetic dipole is in a state with the lowest potential energy $-\vec{M} \cdot \vec{B}$. Then opposite magnetic charges may approach each other, and like magnetic charges may be away from each other. If the external magnetic field is inhomogeneous, due to the difference between the magnetic induction intensities in the positions of the positive and negative magnetic charges of the magnetic dipoles, a translational resultant force oriented towards a direction in which the magnetic field increases may be applied to the whole magnetic dipole. When the external magnetic field is homogeneous, the translational resultant force is zero.

Figure 5:
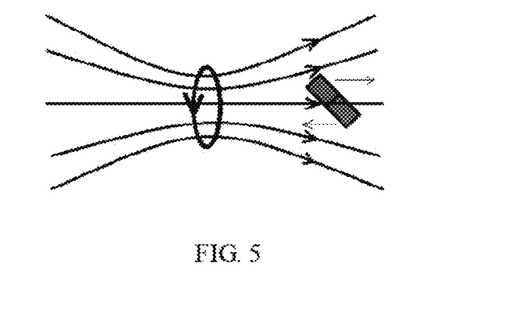
FIGS. 5 through 7 are force diagrams for a magnetic dipole in a magnetic field.
Figure 6:
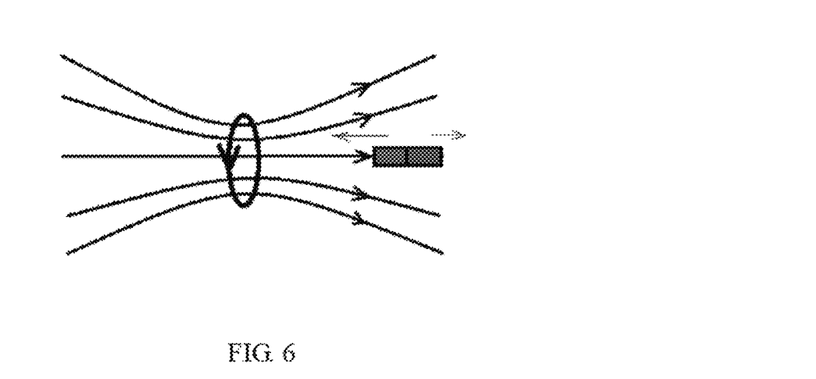
Figure 7:
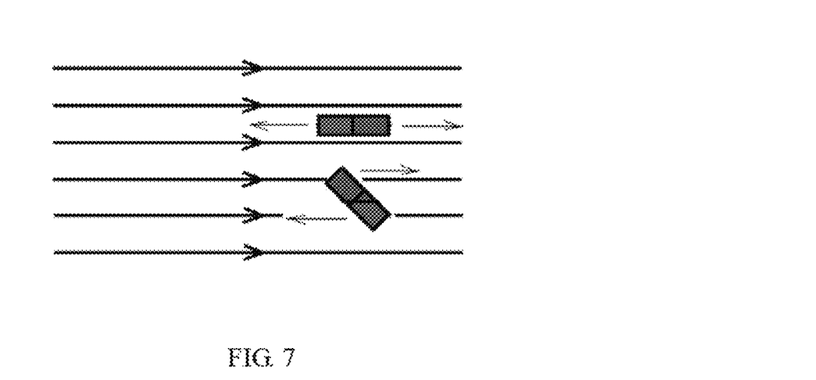

With reference to FIGS. 5 through 7, a gradient magnetic field is generated by an annular current. The magnetic dipole therein may be subject to a rotational moment and a translational force, while the magnetic dipole in a homogeneous magnetic field may be only subject to the moment, and the translational resultant force acting on it is zero. So, the rotational moment and the translational force may be applied via the homogeneous magnetic field and the gradient magnetic field respectively, so as to control the posture and the position of the small magnetic proof mass.

Control of the Position of the Small Magnetic Proof Mass

The magnetic moments of the four pairs of the position control coils are denoted as $\vec{M}_1$, $\vec{M}_2$, $\vec{M}_3$, $\vec{M}_4$, $\vec{M}_{1'}$, $\vec{M}_{2'}$, $\vec{M}_{3'}$, and $\vec{M}_{4'}$, which may generate magnetic fields in the area of the small magnetic proof mass. Because the dimension of the coils is very small, the magnetic fields may be expressed by magnetic dipole fields. To reflect the directions of the magnetic moments of the electricity control coils, the magnetic moments could be expressed by $\vec{M}_i = \delta_i M_i \vec{1}$ (i=1, 2, 3, 4, 1', 2', 3', 4') where $M_i$ denotes the sizes of the magnetic moments and $\delta_i$ denotes the directions of the magnetic moments. If $\delta_i = 1$, the magnetic moment is in the direction of the positive x-axis. If $\delta_i = -1$, the magnetic moment is in the direction of the negative x-axis.

The magnetic moment of the small magnetic proof mass is denoted as $\vec{M}$. The magnetic force applied by the electricity control coils on the small magnetic proof mass will be calculated below. The first pair of the position control coils 1, 1' will be taken as an example to make an analysis. First, the magnetic force applied by $\vec{M}_1$ to $\vec{M}$ will be calculated. A vector starting from $\vec{M}$ to $\vec{M}_1$ is denoted as $\vec{r}$, the coordinates of the center of the magnetic moment $\vec{M}$ as (x, y, z) and the coordinates of the relative center of the magnetic moment $\vec{M}_1$ as (a, b, c). Then $$\vec{r}_1 = (a-x)\vec{i} + (b-y)\vec{j} + (c-z)\vec{k} \tag{10}$$

An interaction potential energy therein may be given by $$U_1 = \frac{\mu_0}{4\pi r_1^3}\left[\vec{M}\cdot\vec{M}_1 - 3(\vec{M}\cdot\hat{r}_1)(\vec{M}_1\cdot\hat{r}_1)\right] \tag{11}$$

According to $$\frac{\partial r_1}{\partial x} = \frac{x-a}{r_1}, \frac{\partial r_1}{\partial y} = \frac{y-b}{r_1}, \frac{\partial r_1}{\partial z} = \frac{z-c}{r_1} \tag{12}$$

and $$\frac{\partial \hat{r}_1}{\partial x} = -\frac{1}{r_1}\left(\vec{i} + \frac{x-a}{r_1^2}\vec{r}_1\right) \tag{13}$$

$$\frac{\partial \hat{r}_1}{\partial y} = -\frac{1}{r_1}\left(\vec{j} + \frac{y-b}{r_1^2}\vec{r}_1\right) \tag{14}$$

$$\frac{\partial \hat{r}_1}{\partial z} = -\frac{1}{r_1}\left(\vec{k} + \frac{z-c}{r_1^2}\vec{r}_1\right) \tag{15}$$

the magnetic force acting on the small magnetic proof mass can be given by $$F_{x1} = -\frac{\partial U_1}{\partial x} = \frac{\mu_0}{4\pi}\frac{a\delta_1}{r_1^5}MM_1\left[-9 + 15\left(\frac{a}{r_1}\right)^2\right] \tag{16}$$

$$F_{y1} = -\frac{\partial U_1}{\partial y} = \frac{\mu_0}{4\pi}\frac{b\delta_1}{r_1^5}MM_1\left[-3 + 15\left(\frac{a}{r_1}\right)^2\right] \tag{17}$$

$$F_{z1} = -\frac{\partial U_1}{\partial z} = \frac{\mu_0}{4\pi}\frac{c\delta_1}{r_1^5}MM_1\left[-3 + 15\left(\frac{a}{r_1}\right)^2\right] \tag{18}$$

In the same way, for the control of $\vec{M}_{1'}$ to $\vec{M}$, due to the strict axial symmetry, the coordinates of the center of the magnetic moment $\vec{M}_{1'}$ are (−a, b, c). Accordingly, $\vec{r}_{1'} = (-a-x)\vec{i} + (b-y)\vec{j} + (c-z)\vec{k}$. The interaction potential energy between $\vec{M}_{1'}$ and $\vec{M}$ is given by $$U_{1'} = \frac{\mu_0}{4\pi r_{1'}^3}\left[\vec{M}\cdot\vec{M}_{1'} - 3(\vec{M}\cdot\hat{r}_{1'})(\vec{M}_{1'}\cdot\hat{r}_{1'})\right]$$

Then, $$F_{x1'} = -\frac{\partial U_{1'}}{\partial x} = \frac{\mu_0}{4\pi}\frac{a\delta_{1'}}{r_{1'}^5}MM_1\left[-9 + 15\left(\frac{a}{r_{1'}}\right)^2\right] \tag{20}$$

$$F_{y1'} = -\frac{\partial U_{1'}}{\partial y} = \frac{\mu_0}{4\pi}\frac{b\delta_{1'}}{r_{1'}^5}MM_1\left[-3 + 15\left(\frac{a}{r_{1'}}\right)^2\right] \tag{21}$$

$$F_{z1'} = -\frac{\partial U_{1'}}{\partial z} = \frac{\mu_0}{4\pi}\frac{c\delta_{1'}}{r_{1'}^5}MM_1\left[-3 + 15\left(\frac{a}{r_{1'}}\right)^2\right] \tag{22}$$

Due to x→0, y→0 and z→0, the small magnetic proof mass can be controlled to be brought back to the origin whenever the center of mass of the proof mass deviates from the origin. In addition, the first pair of the position control coils is strictly axial symmetric, and the sizes of the coils and the currents thereof are equal, so $$r_1 = r_{1'}, M = M_{1'} \tag{23}$$

It can be seen that components in three directions of the electromagnetic force applied by the first pair of the position control coils 1, 1' on the small magnetic proof mass can be controlled independently, as long as values of $\delta_1$, $\delta_{1'}$, and (a, b, c) are controlled. The analysis above can also be applied to the other three pairs of the position control coils. The specific control method will be described below.

(1) For the first pair of the position control coils 1, assuming that $\delta_1 = \delta_{1'} = 1$ or −1, and c=0, then, $$F_{x1} = F_{x1'}, F_{y1} = F_{y'}, F_{z1} = F_{z1'} = 0 \tag{24}$$

which means that the independent control of the component force in the y-direction can be achieved.

In addition, when $\delta_1 = 1$, $\delta_{1'} = -1$ or $\delta_1 = -1$, $\delta_{1'} = 1$, and c=0, then $$F_{x1} = F_{x1'}, F_{y1} = F_{y'}, F_{z1} = F_{z1'} = 0 \tag{25}$$

which means that the independent control of the component force in the x-direction can also be achieved.

(2) For the second pair of the position control coils 2, 2', assuming that $\delta_2 = \delta_{2'} = 1$ or −1, and b=0, then, $$F_{x1} = F_{x1'}, F_{y1} = F_{y'} = 0, F_{z1} = F_{z1'} \tag{26}$$

which means that the independent control of the component force in the z-direction can be achieved.

In addition, when $\delta_2 = 1$, $\delta_{2'} = -1$ or $\delta_2 = -1$, $\delta_{2'} = 1$, and b=0, then $$F_{x1} = F_{x1'}, F_{y1} = F_{y'} = 0, F_{z1} = F_{z1'} \tag{27}$$

which means that the independent control of the component force in the x-direction can also be achieved.

(3) For the third pair of the position control coils 3, 3', assuming that $\delta_3 = 1$, $\delta_{3'} = -1$ or $\delta_3 = -1$, $\delta_{3'} = 1$, and c=0, then, $$F_{x1} = F_{x1'}, F_{y1} = F_{y'}, F_{z1} = F_{z1'} = 0 \tag{28}$$

which means that the independent control of the component force in the x-direction can be achieved. Similarly, the independent control of the component force in the y-direction for the third pair of the position control coils 3, 3' can also be achieved.

(4) The function of the fourth pair of the position control coils is similar to that of the three pairs above. It can be seen that three pairs of the control coils are needed if the translational motions in three directions of x, y and z are needed to be controlled. The fourth pair of the position control coils may be used as the redundant coils. When one of the other three pairs of the control coils fails, this one can be replaced by the redundant coils to independently control the corresponding component force.

Control of the Posture of the Small Magnetic Proof Mass

The posture of the small magnetic proof mass can be controlled by the two pairs of the posture control coils 5, 5' and 6, 6', the magnetic moments of which are denoted as $\vec{M}_5$, $\vec{M}_{5'}$, $\vec{M}_6$, and $\vec{M}_{6'}$ respectively. The magnetic induction intensities generated by these two pairs of coils in the area of the small magnetic proof mass are denoted as $\vec{B}_5$ and $\vec{B}_6$. The distance between the center of the two pairs of coils and the origin is denoted as l. The sizes of the pairs of coils, the directions and the sizes of the currents are completely identical, then $\vec{M}_5 = \vec{M}_{5'}$, and $\vec{M}_6 = \vec{M}_{6'}$.

Figure 8:
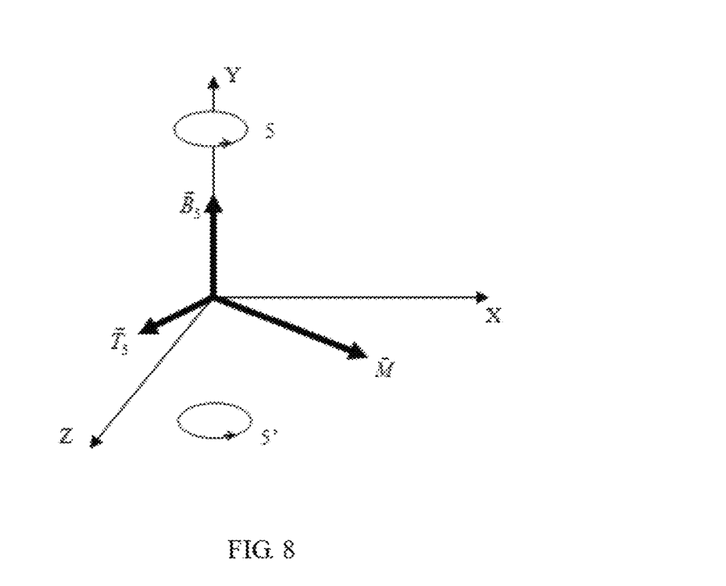
FIG. 8 illustrates the small magnetic proof mass subject to a moment from a first pair of posture control coils.

(1) The control of the first pair of the posture control coils 5, 5' to the small magnetic proof mass will be analyzed below. As shown in FIG. 8, if the small magnetic proof mass deviates from the x-direction, the small magnetic proof mass may be subject to a force moment $\vec{T}_5$ applied thereon by a magnetic field generated by the first pair of the posture control coils 5, 5', then $$\vec{T}_5 = \vec{M} \times \vec{B}_5 \tag{29}$$

Because the dimension of the first pair of the posture control coils 5, 5' is larger than the area in which the small magnetic proof mass is located, the magnetic field generated in the area of the small magnetic proof mass is approximately homogeneous. The magnetic field is in the y-direction. According to the equation of the magnetic induction intensity of the magnetic dipole field, i.e., $$B_{5y} = \frac{\mu_0}{\pi} \frac{M_5}{l^3} \tag{30}$$

the corresponding force moment can be given by $$T_5 = \frac{\mu_0}{\pi} \frac{M_5 M}{l^3} \tag{31}$$

The force moment is in a direction perpendicular to the plane formed by $\vec{M}$ and $\vec{B}_5$. Apparently, the magnetic moment $\vec{M}$ may be diverted in the x-y plane from the y-direction to the x-direction due to the force moment.

Figure 9:
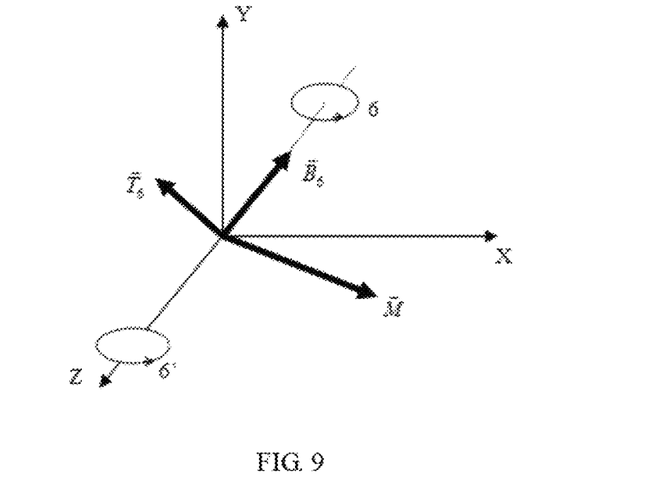
FIG. 9 illustrates the small magnetic proof mass subject to a moment from a second pair of posture control coils.

(2) The control of the second pair of the posture control coils 6, 6' to the small magnetic proof mass will be analyzed below. As shown in FIG. 9, the analysis for the control of the second pair of the posture control coils 6, 6' to the small magnetic proof mass is similar to that for the control of the first pair of the posture control coils 5, 5' to the small magnetic proof mass. The magnetic moment $\vec{M}$ may be diverted in the x-y plane from the z-direction to the x-direction due to the force moment $\vec{T}_6$. Accordingly, $$T_6 = \frac{\mu_0}{\pi} \frac{M_6 M}{l^3} \tag{32}$$

The magnetic moment of the small magnetic proof mass can be controlled to be kept in the x-direction constantly due to the two pairs of the coils.

The measurement of the high-precision acceleration will be described below.

In the control of the translational motion and the rotation of the small magnetic proof mass, the electromagnetic force, acting on the small magnetic proof mass and generated by the position control coils, counteracts the acceleration generated by the spacecraft subject to a non-conservative force, keeping the center of mass of the small magnetic proof mass constantly coincident with the center of mass of the spacecraft. Then, the relationship between the magnetic force vector F and the acceleration vector a can be expressed by F=ma where m denotes the mass of the small magnetic proof mass. The magnitude of the electromagnetic force is proportional to the magnitude of the magnetic field generated by the position control coils. The magnitude of the magnetic field generated by the position control coils is proportional to the magnitude of the current. So, the acceleration of the spacecraft can be measured precisely via the current applied in the position control coils.

The high-precision magnetic suspension accelerometer of the present invention keeps advantages of the electrostatic suspension accelerometer, but avoids a technical bottleneck that the sensitive structure is difficult to be processed. The magnetically shielded vacuum chamber system can be easily realized. Influential factors of the circuit can be reduced and the position and the posture of the small magnetic proof mass can be measured precisely in real time via the optical coherence displacement detecting system. The position and the posture of the small magnetic proof mass can be precisely controlled via the magnetic suspension control system. Based on that the current in the position control coils is proportional to the linear acceleration of the small magnetic proof mass, the high-precision measurement of the acceleration vector can be realized.

By ground simulation calculations, the high-precision magnetic levitation accelerometer produced has a noise power spectral density of less than $10^{-8}$ m·s$^{-2}$·Hz$^{-1/2}$ and a measurement bandwidth of 5-100 mHz.

Figure 10:
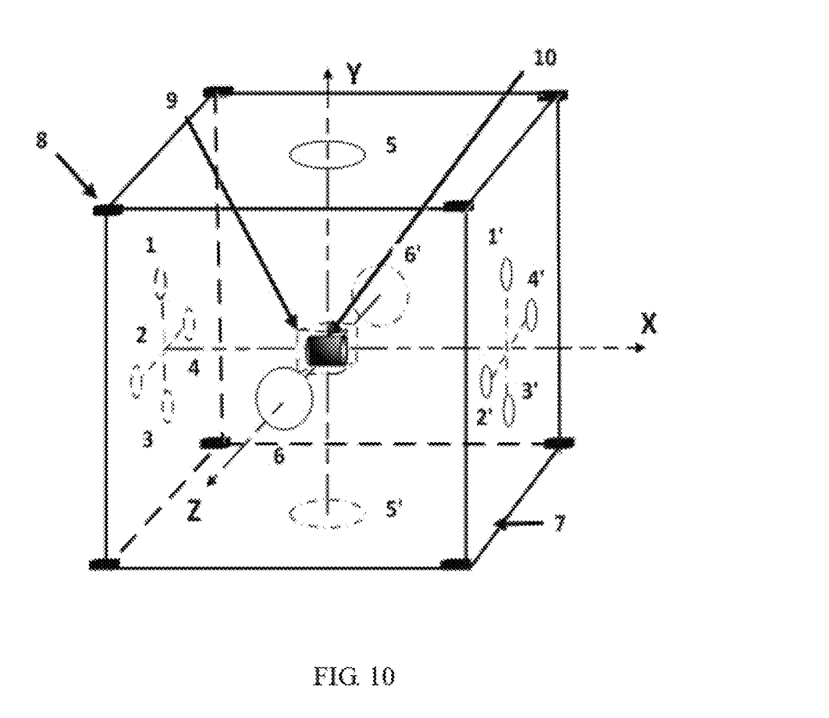
FIG. 10 is a schematic view of a second embodiment of a high-precision magnetic suspension accelerometer of the present invention.

In addition, the present invention provides another embodiment of the high-precision magnetic suspension accelerometer for measuring the linear acceleration of the spacecraft. FIG. 10 shows a high-precision magnetic suspension accelerometer of the present invention, including a magnetically shielded vacuum chamber system, a magnetic displacement sensing system, a magnetic suspension control system and a small magnetic proof mass 10. The magnetically shielded vacuum chamber system includes a magnetically shielded outer chamber and a systemic inner chamber 7. The systemic inner chamber 7 is disposed inside the magnetically shielded outer chamber. The systemic inner chamber 7 is vacuum. The magnetic displacement sensing system includes a plurality of high-precision magnetic sensors 8 disposed in different positions inside the systemic inner chamber for monitoring the position and the posture of the small magnetic proof mass 10 in real time through the detection of magnetic signals. The magnetic suspension control system includes a plurality of groups of position control coils and a plurality of groups of posture control coils. The position control coils are arranged symmetrically on the left and right side walls of the systemic inner chamber. The posture control coils are arranged symmetrically on the upper, lower, front and rear side walls of the systemic inner chamber. The magnetic suspension control system receives the feedback from the magnetic displacement sensing system via the position control coils and the posture control coils, and controls the position and the posture of the small magnetic proof mass 10 in real time to keep it levitating in the center of the systemic inner chamber constantly. The center of the systemic inner chamber is coincident with the center of mass 9 of the spacecraft. The small magnetic proof mass 10 may be the same as the small magnetic proof mass b in the first embodiment.

In this embodiment, eight high-precision magnetic sensors are each disposed at one of the eight vertexes of the systemic inner chamber, and their locations are fixed. The position and the posture of the small magnetic proof mass can be monitored in real time based on the datas of the magnetic field detected by the eight magnetic sensors.

The small magnetic proof mass 10 may be spheroidal, circular or cylindrical. Of course, it may also be in any other shapes. The size, magnitude of the magnetic moment, etc., of the small magnetic proof mass selected are known precisely.

In this embodiment, the methods for the control of the position and the posture of the small magnetic proof mass and the measurement of the accelerations are the same as those in the first embodiment, and thus will not be described herein in detail.

Figure 11:
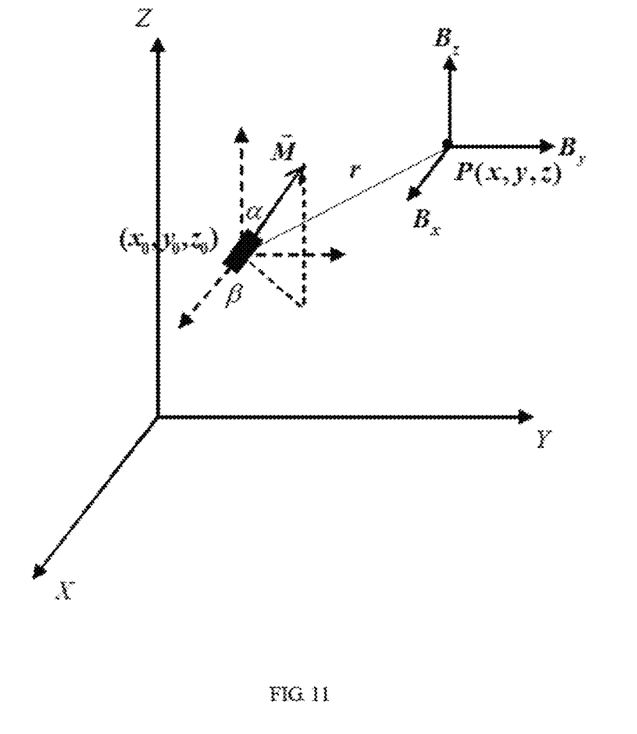
FIG. 11 illustrates the basic principle of a magnetic displacement sensing technique.

The high-precision magnetic suspension accelerometer of the present invention is made of nonmagnetic material, the magnetic permeability of which can be considered to be the same as that of the vacuum. So the distribution of the magnetic field generated by the small magnetic proof mass is only related to the position and the posture of the small magnetic proof mass. Further, the magnitude of the magnetic field measured is also related to the position of the probe point. As shown in FIG. 11, the each corresponding coordinate system of the magnetic sensors is assumed to be a space global coordinate system. The coordinates of the center of mass of the small magnetic proof mass are denoted as $(x_0, y_0, z_0)$, the coordinates of the probe point P as $(x, y, z)$ and the distance between the center of mass of the small magnetic proof mass and the probe point as $r$. When this distance is considerably larger than the size of the small magnetic proof mass, the small magnetic proof mass can be approximated as a magnetic dipole. The equivalent magnetic moment vector of the small magnetic proof mass is denoted as $\vec{M}$. An azimuthal angle and an elevation angle of $\vec{M}$ in the space coordinate system are denoted as $\alpha$ and $\beta$ respectively (reflecting the spatial posture of the small magnetic proof mass).

According to equations for components of the magnetic field of the probe point, i.e., $$B_x = \frac{\mu_0 M}{4\pi r^5}[(2(x-x_0)^2 - (y-y_0)^2 - (z-z_0)^2)\sin\alpha\cos\beta +$$
$$3(x-x_0)(y-y_0)\sin\alpha\sin\beta + 3(x-x_0)(z-z_0)\cos\alpha]$$

$$B_y = \frac{\mu_0 M}{4\pi r^5}[(2(y-y_0)^2 - (x-x_0)^2 - (z-z_0)^2)\sin\alpha\sin\beta +$$
$$3(x-x_0)(y-y_0)\sin\alpha\cos\beta + 3(y-y_0)(z-z_0)\cos\alpha]$$

$$B_z = \frac{\mu_0 M}{4\pi r^5}[(2(z-z_0)^2 - (x-x_0)^2 - (y-y_0)^2)\cos\alpha +$$
$$3(x-x_0)(z-z_0)\sin\alpha\cos\beta + 3(y-y_0)(z-z_0)\sin\alpha\sin\beta]$$

with $r = \sqrt{(x-x_0)^2 + (y-y_0)^2 + (z-z_0)^2}$.

assuming that the components of the magnetic induction intensities in the n probe points are known, then a system of 3n nonlinear equations can be given, with six unknown parameters, i.e., $x_0$, $y_0$, $z_0$, $\alpha$, $\beta$ and M. When n>2, this system of equations is overdetermined and can be solved with the nonlinear optimization algorithm. The six unknown parameters can be determined through computer programming. So the position and the posture of the small magnetic proof mass at any given time can be determined.

When the high-precision magnetic sensors (with a sensitivity of, such as, 0.01 nT) are used in the magnetic displacement sensing system, the precision of localisation may be less than 2 nm, and the measurement precision of posture and rotation of the small magnetic proof mass may be less than 0.02 arcsec.

Four groups of position control coils and two groups of posture control coils are provided in the magnetic suspension control system. As shown in FIG. 10, by applying currents in different directions and with different magnitudes in the four groups of the position control coils (1, 1'), (2, 2'), (3, 3') and (4, 4'), the magnitudes and the directions of the components in the directions of x, y, and z of the electromagnetic force acting on the small magnetic proof mass can be independently controlled, so as to control the position of the small magnetic proof mass and keep the center of mass thereof (i.e., the center of mass of the spacecraft) in the center of the chamber constantly. The posture of the small magnetic proof mass can be controlled via the two groups of the posture control coils (5, 5'), (6, 6') to keep the magnetic moment of the small magnetic proof mass in the x-direction. The magnitude of the current in the coils can be controlled precisely ranging across more than seven orders of magnitude, such as in a current range of 1 nA-10 mA.

The high-precision magnetic suspension accelerometer of the present invention keeps advantages of the electrostatic suspension accelerometer, but avoids a technical bottleneck that the sensitive structure is difficult to be processed. The magnetically shielded vacuum chamber system can be easily realized. The real-time position of the small magnetic proof mass can be measured precisely via the high-precision magnetic sensors. The small magnetic proof mass can be precisely controlled via the magnetic suspension control system. So, the high-precision measurement of the acceleration vector can be realized.

By ground simulation calculations, the high-precision magnetic suspension accelerometer produced has a noise power spectral density of less than $10^{-8}$ m·s$^{-2}$·Hz$^{-1/2}$.

Each embodiment of the present invention above is described in a progressive way, and emphasizes the differences from other embodiments. The same or like parts among the embodiments can be cross-referenced by each other.

The principle and embodiment of the present invention have been illustrated through some specific examples. The above-mentioned description about the embodiments is just used for assist in understanding of the method and spirit of the present invention. It should be appreciated that modifications and changes can be made to the embodiments and application range for those skilled in the art based on the principle of the invention. So, the content of the specification shall not be construed as the limitation to the invention.

What is claimed is:

1. A magnetic suspension accelerometer, comprising:
    a magnetically shielded vacuum chamber system;
    an optical coherence displacement detecting system;
    a magnetic suspension control system; and
    a magnetic proof mass,
    wherein the magnetic proof mass can move along three orthogonal axes,
    wherein, the magnetically shielded vacuum chamber system comprises a magnetically shielded outer chamber and a systemic inner chamber which is disposed inside the magnetically shielded outer chamber and at vacuum, with the magnetic proof mass disposed inside the systemic inner chamber, wherein the optical coherence displacement detecting system, disposed on the systemic inner chamber, is configured to monitor a position and a posture of the magnetic proof mass in real time by sending an optical signal to the magnetic proof mass and receiving an optical signal reflected back, wherein the magnetic suspension control system, disposed on the systemic inner chamber, is configured to control the position and the posture of the magnetic proof mass in real time to keep the magnetic proof mass continuously levitating in a center of the systemic inner chamber, wherein the optical coherence displacement detecting system comprises a plurality of pairs of interferometer probes with each pair connected to an optical displacement detecting device via an optical fiber, wherein, the optical displacement detecting device is a Michelson or Fabry-Perot displacement detecting device and the interferometer probes are located at different positions inside the systemic inner chamber, wherein a light source sends optical signals to the magnetic proof mass via each pair of the interferometer probes in the optical coherence displacement detecting system and receives optical signals reflected back by the magnetic proof mass, the optical signals containing the information of the position and the posture of the magnetic proof mass, wherein the optical signals are transmitted to the optical displacement detecting device through the optical fiber, and processed according to a principle of optical interference to convert displacements and deflection angles of the magnetic proof mass into changes of interfered light, and wherein, based on measurement results of each pair of the interferometer probes and by a calculation according to a principle of vector addition, the displacement of the magnetic proof mass deviating from the center of the systemic inner chamber, and a rotation angle of the magnetic proof mass rotating about two rotational axes perpendicular to a direction of a magnetic moment, are determined according to a change in displacement of each probe point and fed back to the magnetic suspension control system to control the position and the posture of the magnetic proof mass in real time.

2. The accelerometer of claim 1, wherein five pairs of the interferometer probes are provided, wherein three pairs of interferometer probes are provided in the x-direction of the systemic inner chamber, wherein one pair of the three pairs of interferometer probes, arranged on a right chamber wall along the y-direction and vertically symmetrical about a face center, is configured to measure the posture change of the magnetic proof mass rotating about the z-axis, wherein another pair of the three pairs of interferometer probes, arranged on the right chamber wall along the z-direction and horizontally symmetrical about the face center, configured to measure the posture change of the magnetic proof mass rotating about the y-axis, wherein the last pair of the three pairs of interferometer probes, arranged in centers of left and right chamber walls along the x-direction, is configured to measure a translational displacement of the magnetic proof mass in the x-direction, wherein one pair of the five pairs of interferometer probes, provided in the y-direction of the systemic inner chamber, in centers of upper and lower chamber walls, is configured to measure the translational displacement of the magnetic proof mass in the y-direction, and wherein the last pair of the five pairs of interferometer probes, provided in the z-direction of the systemic inner chamber in centers of front and rear chamber walls, is configured to measure the translational displacement of the magnetic proof mass in the z-direction.

3. The accelerometer of claim 1, wherein the magnetic suspension control system comprises a plurality of pairs of position control coils arranged symmetrically on left and right side walls of the systemic inner chamber and a plurality of posture control coils arranged symmetrically on upper, lower, front and rear side walls of the systemic inner chamber, and wherein the magnetic suspension control system receives a feedback from the optical coherence displacement detecting system via the position control coils and the posture control coils, and controls the position and the posture of the magnetic proof mass in real time to keep the magnetic proof mass continuously levitating in the center of the systemic inner chamber.

4. The accelerometer of claim 3, wherein four pairs of the position control coils, symmetric about the x-axis, are mounted on the left and right chamber walls in the x-direction of the systemic inner chamber, and are capable of making the center of mass of the magnetic proof mass kept in the center of the systemic inner chamber constantly by being applied with currents in different directions and with different intensities.

5. The accelerometer of claim 3, wherein two pairs of the posture control coils are mounted in centers of the upper and lower chamber walls of the systemic inner chamber in the y-direction and in centers of the front and rear chamber walls in the z-direction respectively, and wherein a diameter of the posture control coils is larger than an overall dimension of the magnetic proof mass, and the posture control coils are configured to control the posture of the magnetic proof mass to keep an equivalent magnetic moment of the magnetic proof mass in the x-direction constantly.

6. The accelerometer of claim 3, wherein in a control of the translational motion and a rotation of the magnetic proof mass, an electromagnetic force, acting on the magnetic proof mass and generated by the position control coils, counteracts the acceleration generated by a spacecraft subject to a non-conservative force, keeping the center of mass of the magnetic proof mass constantly coincident with the center of mass of the spacecraft, and wherein, a relationship between the magnetic force vector F and the acceleration vector a is expressed by $F=ma$ where m denotes the mass of the magnetic proof mass, a magnitude of the electromagnetic force is proportional to the magnitude of the magnetic field generated by the position control coils, a magnitude of the magnetic field generated by the position control coils is proportional to a magnitude of the current, and the acceleration of the spacecraft can be measured via the current applied in the position control coils.

7. The accelerometer of claim 1, wherein the magnetic proof mass is cylindrical.

8. The accelerometer of claim 1, wherein the magnetic proof mass is made of permanent magnetic material, or an inner core of a permanent magnet is used as the magnetic proof with outside of the inner core covered with non-magnetic material.

9. The accelerometer of claim 1, wherein the systemic inner chamber has three pairs of opposed sidewalls,
   wherein the optical coherence displacement detecting system comprises:
      a first set of sensors on opposite walls of a first pair of the opposed sidewalls to detect movement along a first axis;
      a second set of sensors on opposite walls of a second pair of the opposed sidewalls to detect movement along a second axis; and
      a third set of sensors on opposite walls of a third pair of the opposed sidewalls to detect movement along a third axis.

10. The accelerometer of claim 9, further comprising a fourth set of sensors on a wall of the first pair of opposed sidewalls to detect rotation about the second axis.

11. The accelerometer of claim 10, further comprising a fifth set of sensors on the wall of the first pair of opposed sidewalls to detect rotation about the third axis.

12. The accelerometer of claim 1, wherein the systemic inner chamber has three pairs of opposed sidewalls.

13. The accelerometer of claim 1, wherein the optical coherence displacement detecting system comprises sensors to detect movement along the three orthogonal axes.

* * * * *